United States Patent [19]

Lucas

[11] Patent Number: 4,975,574
[45] Date of Patent: Dec. 4, 1990

[54] METHOD OF AND APPARATUS FOR MEASURING THE MEAN CONCENTRATION OF THORON AND/OR RADON IN A GAS MIXTURE

[76] Inventor: Henry Lucas, P.O. Box 1454, Sedona, Ariz. 86336

[21] Appl. No.: 461,333

[22] Filed: Jan. 5, 1990

[51] Int. Cl.$^5$ ............................................. G10T 5/00
[52] U.S. Cl. .................................. 250/253; 250/472.1
[58] Field of Search .................. 250/253, 255, 370.02, 250/370.06, 380, 472.1, 435

[56] References Cited

U.S. PATENT DOCUMENTS

| | | |
|---|---|---|
| 2,624,846 | 1/1953 | Tochilin et al. .................. 250/482.1 |
| 3,922,555 | 11/1975 | Chapuis et al. ................... 250/472.1 |
| 4,186,303 | 1/1980 | Smith et al. ......................... 250/253 |
| 4,295,045 | 10/1981 | Minami ............................... 250/255 |
| 4,385,236 | 5/1984 | Hassib et al. ..................... 250/472.1 |
| 4,442,358 | 4/1984 | Kreiner ............................... 250/364 |
| 4,511,799 | 4/1985 | Bjorkholm .......................... 250/367 |
| 4,518,860 | 5/1985 | Alter et al. .......................... 250/253 |
| 4,626,688 | 12/1986 | Barnes ............................. 250/370.06 |
| 4,700,067 | 10/1987 | Carossi et al. ..................... 250/380 |
| 4,700,070 | 10/1987 | Kovac ................................. 250/304 |
| 4,778,992 | 10/1988 | Wheeler ............................. 250/255 |

OTHER PUBLICATIONS

"Radon and Thoron Dosimetry by Plastic Solid State Nuclear Track Detectors", Khan et al., Nuclear Instruments and Methods #147, No. 1, Nov. 15, 1977, pp. 125-131.

Primary Examiner—Janice A. Howell
Assistant Examiner—Drew A. Dunn
Attorney, Agent, or Firm—Emrich & Dithmar

[57] ABSTRACT

A method of and an apparatus for detecting and accurately measuring the mean concentrations of $^{222}$Rn and $^{220}$Tn in a gas mixture, such as the ambient atmosphere in a mine, is provided. The apparatus includes an alpha target member which defines at least one operative target surface and which is preferably fabricated from a single piece of an alpha particle sensitive material. At least one portion of the operative target surface is covered with an alpha particle filter. The uncovered and filter covered operative surface is exposed to the gas mixture containing the $^{222}$Rn and $^{220}$Tn. In the radioactive decay series of these isotopes the maximum kinetic energy emitted by the alpha decay of $^{222}$Rn is about 1.1 MeV less than the maximum kinetic energy emitted by the alpha decay of a $^{220}$Tn. The alpha particle filter has a predetermined mass per unit area of the covered portion of the operative target surface that prevents penetration of alpha particles which originate from $^{222}$Rn decay, but which allows passage therethrough of the maximum kinetic energy alpha particles from $^{220}$Tn decay. Thus, a count of the alpha particle tracks in the uncovered portion of the target member is proportional to the mean concentration of sum of $^{222}$Rn and $^{220}$Tn in the gas mixture, while the count of alpha tracks in the target member under the filter is proportional to the concentration of only the $^{220}$Tn in the gas mixture.

15 Claims, 1 Drawing Sheet

METHOD OF AND APPARATUS FOR MEASURING THE MEAN CONCENTRATION OF THORON AND/OR RADON IN A GAS MIXTURE

BACKGROUND OF THE INVENTION

The present invention relates generally to a method of and apparatus for accurately detecting and measuring the mean concentrations, over time, of thoron and/or radon in a gas mixture, such as the ambient atmosphere in a mine shaft where these substances are likely to be present. Specifically, the method and apparatus of the invention may be adapted for measuring the mean radon and thoron concentrations in test gas mixtures for exposures of more than 100 pCi liter days.

Many naturally occurring elements, most notably those of atomic numbers from 81 to 92, undergo spontaneous radioactive decay. A naturally occurring radioactive element emits alpha particles (having a discrete kinetic energy) or beta particles (which may be accompanied by gamma rays) and thereby forms a new isotope. The new isotope may itself be radioactive so that further alpha and/or beta decay occurs until a stable isotope is finally formed. Thus, most naturally occurring radioactive elements are said to undergo a radioactive decay series which includes several isotopes.

The emission of an alpha particle decreases the atomic weight of an element by four units and its atomic number by two units. When a radioactive element emits a beta particle, the atomic number of the element increases by one unit but the atomic mass remains substantially unaltered.

Radium (usually denoted $^{226}Ra$) is solid at ambient temperatures and pressures. The first stage of its radioactive decay series results in the formation of radium emanation, or radon ($^{222}Rn$), a noble gas. The decay of $^{226}Ra$ to $^{222}Rn$ is accompanied by the emission of an alpha particle having a discrete kinetic energy of about 4.8 MeV, a mass equivalent to a helium nucleus and a charge equivalent to $+2e$. $^{222}Rn$ gas undergoes further radioactive decay via alpha and beta emissions, until a stable form of the element, sometimes referred to as radium G is finally formed. Radium G is isotopic with lead (often denoted $^{206}Pb$) and does not itself exhibit any further radioactivity. The radioactive decay of $^{226}Ra$ thus includes a series of daughter products, only one of which, $^{222}Rn$, is gaseous. In each instance, however, the formation of a new daughter product results in the emission of an alpha or beta particle.

Thorium (which has an atomic number 90, and atomic weight of approximately 232, often denoted $^{232}Th$) also undergoes radioactive decay in a series via alpha and beta emissions, like $^{226}Ra$. Again, only one daughter product of the thorium decay series, commonly referred to as thorium emanation, or thoron ($^{220}Tn$) is gaseous. As $^{220}Tn$ undergoes further radioactive decay, the final daughter product is often referred as thorium D and has an atomic number 82 and an atomic weight 208. Like radium G, thorium D is isotopic with lead and does not exhibit further radioactivity.

When any radioactive element undergoes alpha decay, the emitted alpha particle is imparted with a discrete kinetic energy. The alpha particle is propelled in a random, linear direction from the decaying atom. The alpha particle will therefore travel a given distance through the medium into which it is ejected, until it is stopped by the absorption of its kinetic energy by the mass of the medium through which it passes. Thus, for a given radioactive gas atom undergoing alpha decay in air, the alpha particle will be propelled in a linear direction from the point source of the decaying atom, and will terminate its travel at some point corresponding to a spherical surface about the decaying gas atom. This distance of travel will, of course, vary with mass of the medium and the kinetic energy of the alpha particle. This distance may be referred to as the "range" of the alpha particle and, in air, is about 0.8 to 0.9 centimeters per MeV of kinetic energy. Similar range-energy relationships exist for alpha particles passing through other materials, such as metals, plastics, etc.

Because $^{226}Ra$ and $^{232}Th$ are present in varying but substantial concentrations in the earth's crust, $^{222}Rn$ and $^{220}Tn$ gases, and the daughter products generated in their radioactive decay series, are often present in the atmosphere in varying concentrations. However, because only $^{222}Rn$ and $^{220}Tn$ are gaseous (under ambient conditions), the daughter products produced therefrom generally settle out of the atmosphere quite rapidly. Nonetheless, some solid daughter products may remain present in the atmosphere as aerosol particulates.

For many years it has been known that $^{222}Rn$ and $^{220}Tn$ may be concentrated in particular environments that tend to contain or concentrate these gases or in environments which are located particularly close to a source of the same. Thus, $^{222}Rn$ and $^{220}Tn$ gases may concentrate in the atmosphere of buildings and homes (particularly in basements) and in underground cavities such as and mines and geological faults.

While the concentrations of $^{220}Tn$ in buildings has not been well studied, it is estimated to be at least about ten percent of the concentration of $^{222}Rn$ and perhaps many times greater than that amount. Because both $^{222}Rn$ and $^{220}Tn$ are gaseous, they are readily absorbed through inhalation by workers or residents in environments having substantial concentrations of either isotope. Thus, such persons may be exposed to low level radioactivity by the decay of $^{222}Rn$ and $^{220}Tn$ over a substantial period of time. In particular, exposure to higher concentrations of radioactivity may result from the accumulation of the nongaseous but radioactive daughters of these gaseous isotopes. Thus, accurate measurement of $^{222}Rn$ and $^{220}Tn$ in homes and working environments is of particular importance because low levels of radioactivity have been suspected of playing substantial roles in the initiation of cancers of the lung, etc. Furthermore, it is unknown whether the detrimental health effects from exposure to $^{222}Rn$ or $^{220}Tn$ differ in any substantial manner. This indicates a need for accurate, independent measurements of these substances in atmospheres where human exposure is probable.

Because of the known health hazards posed by $^{222}Rn$ gas, many apparatus and methods have been developed for detecting the presence and mean concentration (over time) of this gas. Most such apparatus utilize an alpha particle sensitive material for detecting the presence of and the concentration of $^{222}Rn$ gas. Alpha particle sensitive materials are well-known in the art and are defined herein as any material which permits the detection of an alpha particle collision with the material. Most frequently, a polymeric material such as CR39 is used to detect the presence of alpha particles. An alpha particle penetrating such a polymeric material causes localized damage to the material in a conically shaped region surrounding the linear path of the particle. Because the alpha decay of $^{222}Rn$ and $^{220}Tn$ and each of their daughter products is associated with a discrete kinetic energy imparted to the alpha particle, the depth of penetration of the alpha particle in the polymeric material can determine which isotope or daughter product has decayed.

The alpha particle sensitive materials may be etched by exposure to a hot alkaline solution (e.g., 6M NaOH or KOH at 60° C., a process hereinafter referred to as "developing"). The radiation damaged zones created by the alpha particle penetration (also referred to herein as "alpha tracks") will etch at a rate faster than the balance of the material and will therefore reveal an etch pit at the site of each alpha particle penetration. The depth of the pit, as measured from the surface of the alpha particle sensitive material, is directly proportional to the kinetic energy of the alpha particle at the time of striking the material surface, as well as the angle at which the alpha particle entered the surface of the material.

It is understood that radioactive decay which involves the emission of beta particles does not affect the ability to detect alpha particle penetration in alpha particle sensitive materials. It is also understood in the art that the localized damage imparted to the alpha particle sensitive material is greatest in the region adjacent the terminal point of travel of the alpha particle. Thus, detection of the alpha particle collision is easiest at a zone adjacent the maximum depth of penetration.

$^{222}$Rn, $^{220}$Tn and their daughter products emit alpha particles having discrete kinetic energies, which kinetic energies fall within given ranges. Because the ranges overlap, it has heretofore been difficult to accurately detect the mean concentration of $^{220}$Tn in the presence of $^{222}$Rn. Thus, simple exposure of an alpha particle sensitive material to an atmosphere suspected of containing one of these gases, or a gas mixture which includes both $^{222}$Rn and $^{220}$Tn, will reveal alpha tracks of like or similar depths, generated by both radioactive isotopes and their daughter products.

For this reason, prior art apparatus have been constructed to include a housing having a chamber formed therein and an alpha particle sensitive material contained in the chamber. The housing is impenetrable to alpha particle radiation from either $^{222}$Rn, $^{220}$Tn, their daughter products or other stray sources of alpha radiation ("noise"). The housing has an opening formed therein which communicates with the chamber and which is covered with a semipermeable membrane that permits only the passage of $^{222}$Rn gas therethrough, excluding $^{220}$Tn from the chamber. In this manner, the alpha tracks created in the alpha particle sensitive material are a result only of the radioactive decay of $^{222}$Rn and its daughter products.

Thus, in order to determine the mean concentrations of both $^{222}$Rn and $^{220}$Tn over long periods of time, two detectors have heretofore been required: a first detector which determines the concentration of both $^{222}$Rn and $^{220}$Tn; and a second detector which determines the concentration of $^{222}$Rn only. The mean concentration of $^{220}$Tn in the test atmosphere has then been estimated by the differential count in alpha tracks as registered in the alpha particle sensitive material of the two detectors.

This method, however, has several drawbacks. The efficiency of the $^{222}$Rn only detection device (including the semipermeable membrane) has been reported to be only about 70% of that of the $^{222}$Rn plus $^{220}$Tn device. Furthermore, because two detectors are employed, each of which has a different efficiency, and each of which may include an alpha particle sensitive material from different batches of manufacture, further discrepancies in measuring accuracy may be expected. Finally, because two separate detectors are used, their locations may be remote enough to even further degrade the accuracy of the measurement. Thus, in the prior art measurement of the concentration of $^{222}$Rn and $^{220}$Tn in a test atmosphere, the compounding of measurement error may be expected.

Therefore, there exists a need for a novel method and apparatus capable of accurately detecting the presence and mean concentration of $^{220}$Tn in a test gas mixture, which test gas mixture may include radon. Furthermore, there exists a need for a novel method and device which can simultaneously and accurately detect the presence and relative concentrations (over time) of both $^{222}$Rn and $^{220}$Tn in a test gas mixture, such as air, which includes both $^{222}$Rn and $^{220}$Tn.

OBJECTS AND SUMMARY OF THE INVENTION

It is therefore an object of the present invention to provide a method of and apparatus for accurately detecting and measuring the mean concentration of $^{220}$Tn in a test gas mixture, over time, which test gas mixture may include $^{222}$Rn.

It is another object of the present invention to provide a method of and apparatus for simultaneously and accurately detecting the presence of and measuring the mean concentrations of both $^{220}$Tn and $^{222}$Rn, independently, in a test gas mixture, over time.

Yet another object of the present invention is to provide a method of and apparatus for simultaneously and accurately measuring the mean concentrations of $^{220}$Tn and $^{222}$Rn, over time, in the atmosphere of an enclosure such as an office building, dwelling, geological fault or mine shaft.

Still another object of the present invention is to provide a method of and apparatus for simultaneously and accurately detecting the presence of and the mean concentrations of $^{220}$Tn and $^{222}$Rn, over time, in a test gas mixture, which method and apparatus employ an alpha target member fabricated from a single and continuous piece of alpha particle sensitive material.

In the method of the present invention, the mean concentration of $^{220}$Tn in a test gas mixture, which test gas mixture may include $^{222}$Rn, is accurately measured. The method comprises the steps of forming an alpha target member from an alpha particle sensitive material, so as to include at least one operative target surface on the alpha target member, covering the operative target surface with an alpha particle filter having a predetermined mass per unit area of operative target surface, which predetermined mass per unit area of operative surface is great enough to prevent the passage of alpha particles emitted from the radioactive decay of $^{222}$Rn and/or any daughter products thereof to the underlying operative surface, but which predetermined mass per unit area of operative surface is low enough to permit the passage therethrough of alpha particles emitted from the radioactive decay of $^{220}$Tn, or at least one daughter product thereof, to the underlying operative surface of the alpha target member; shielding all surfaces of the alpha target member, except said at least one operative target surface and said filter member, from alpha particles emitted from the radioactive decay of $^{220}$Tn, $^{222}$Rn or any daughter products thereof, exposing the shielded and filtered alpha target member to the test gas mixture for a predetermined time; counting the number of alpha tracks per unit area of the target surface, formed in the alpha target member through the at least one operative surface, correcting the count of alpha tracks for noise, weighting the count in proportion to the predetermined time and comparing the noise-corrected and time-weighted number of alpha tracks to standard alpha track numbers generated from known concentrations of $^{220}$Tn in a gas to determine the mean concentration of $^{220}$Tn gas in said test gas mixture, over said predetermined time.

The apparatus of the invention, for measuring the mean concentration of $^{220}$Tn in a test gas mixture, over time, which gas mixture may include $^{222}$Rn, comprises an alpha target member fabricated from an alpha particle sensitive material, the alpha target member defining at least one operative target surface, an alpha particle filter covering the operative target surface, the alpha particle filter having a predetermined mass per unit area of operative target surface which is great enough to prevent the passage of alpha particles emitted from the radioactive decay of $^{222}$Rn and any daughter products thereof from passing through the filter and into the underlying operative target surface, and the predetermined mass per unit area being low enough to permit the passage of alpha particles emitted from the radioactive decay of $^{220}$Tn, or at least one daughter product thereof, through the alpha particle filter and through the underlying operative target surface of the target member.

In the preferred embodiments of the method and apparatus of the invention, an alpha target member fabricated from a single piece of alpha particle sensitive material is employed, the alpha target member having at least one operative target surface formed thereon, a portion of the operative target surface being covered with an alpha particle filter, which filter has a predetermined mass per unit area that is great enough to prevent the passage therethrough of alpha particles emitted from the radioactive decay of $^{222}$Rn or any daughters thereof, but which predetermined mass per unit area is low enough to permit the passage of alpha particles emitted from the radioactive decay of $^{220}$Tn or a daughter product thereof through said filter, through said operative target surface which underlies said filter and into said target member; and the target member, except for the operative target surface and said alpha particle filter being covered with an alpha particle shield, so that the apparatus may be exposed to an atmosphere of a given environment or other test gas mixture for a predetermined time and the presence and mean concentration of both $^{222}$Rn and $^{220}$Tn in the atmosphere or test gas mixture can be simultaneously measured and individually determined by comparison of the count of the alpha tracks formed in the target member, through the uncovered operative target surface, and the count of the alpha tracks formed in the alpha target member underlying that portion of the operative target surface covered by the alpha particle filter.

It is also preferable that the alpha particle shield be fabricated in the form of a housing defining a chamber of a predetermined volume therein, which chamber receives the alpha target member. The housing includes an opening formed therein so that the chamber communicates with the test gas therethrough.

The invention consists of certain novel features and a combination of parts and steps hereinafter fully described, illustrated in the accompanying drawings, and particularly pointed out in the appended claims, it being understood that various changes in the details may be made without departing from the spirit or sacrificing any advantages of the present invention.

DETAILED DESCRIPTION OF THE PREFERRED EMBODIMENTS

Figure 1:
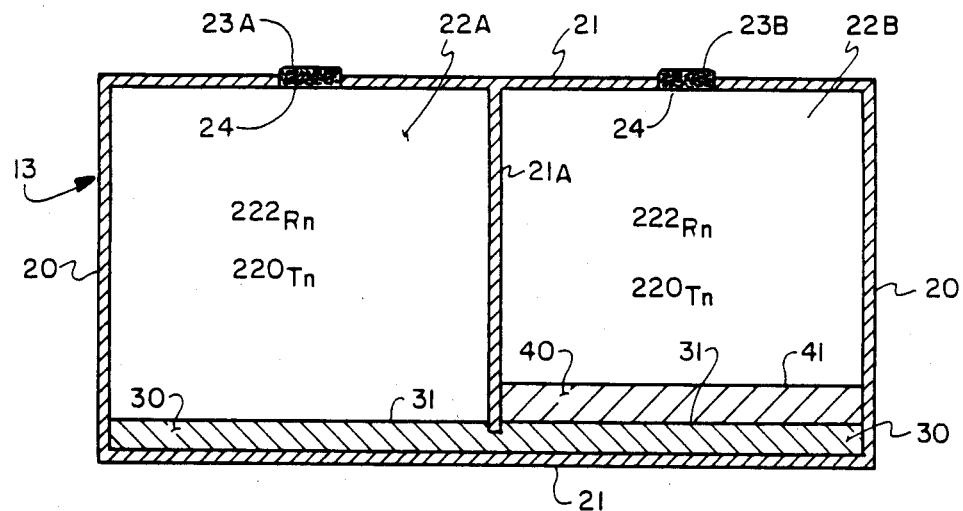
FIG. 1 is a schematic, cross-sectional representation of a preferred embodiment of the apparatus of the present invention for detecting and simultaneously measuring the mean concentrations of $^{222}$Rn and $^{220}$Tn, over time, in an atmosphere where the apparatus is located. The apparatus includes a housing having a pair of separated chambers formed therein, an alpha target member fabricated from a single piece of an alpha particle sensitive material, the alpha target member having an operative target surface formed thereon and an alpha particle filter, covering one portion of the operative target surface.

Referring now to the drawings, and in particular to FIG. 1, there is illustrated a preferred embodiment of the apparatus of the present invention, adapted for simultaneously and accurately detecting the presence and mean concentration, over time, of $^{220}$Tn and $^{222}$Rn gases in a mixture such as the ambient atmosphere in a building or mine shaft. The apparatus of the invention, generally indicated by reference numeral 13, comprises a housing 20, fabricated from an alpha particle shield material. (As used herein, an alpha particle shield material means a material which has sufficient mass to prevent the penetration of alpha particles having nominal kinetic energies therethrough or to a predetermined depth therein where such alpha particles would not interfere with the measurement of alpha particle tracks used to measure $^{222}$Rn and $^{220}$Tn concentrations in accordance with the invention.) The housing 20 is substantially continuous, having connecting walls 21 and an optional center wall 21A, so as to form a pair of chambers 22A and 22B therein. A pair of openings 23A and 23B permit chambers 22A and 22B to communicate with the ambient atmosphere about the apparatus 13. Openings 23A and 23B preferably include a pair of mechanical filters 24, which prevent the entry of dust and other aerosols into chambers 22A and 22B.

As illustrated in FIG. 1, within the chambers 22A and 22B there is included an alpha target member 30, which is preferably fabricated from a single piece of an alpha particle sensitive material. The alpha target member 30 has at least one operative surface 31 defined thereon, the remaining surfaces being covered by the alpha particle shield walls 21. An alpha particle filter 40, which defines a filter surface 41, covers that portion of the operative target surface 31 which is contained in chamber 22B. The alpha particle filter 40 is preferably mechanically fixed to the target member 30 so as to be removable at the conclusion of the exposure of the apparatus 13 to the test atmosphere and prior to development of the target member 30. A soluble adhesive also may be used to fix the alpha particle filter 40 in place.

The apparatus of the invention 13 is fabricated in an environment known to be substantially free of alpha radiation so that substantially no contamination of the alpha target member 30 occurs prior to use. Furthermore, the alpha target member 30 is preferably fabricated from a single piece of alpha particle sensitive material so that any prior contamination that may have occurred is substantially uniform in both chambers 22A and 22B and so that the target material reacts in a similar manner to alpha particle exposure in both chambers. Thus, after assembly of the invention 13 as depicted in FIG. 1, openings 23A and 23B are sealed with gas-tight alpha particle shields (not shown) so that the atmospheres within chambers 22A and 22B remain uncontaminated by $^{222}$Rn or $^{220}$Tn gases.

To initiate a survey to measure the presence of and the mean concentrations of $^{222}$Rn and $^{220}$Tn, the apparatus of the invention 13 is placed in the desired location and the gas-tight alpha particle shields over openings 23A and 23B are removed. Within a reasonably short duration, diffusion between the ambient atmosphere at the test location and the uncontaminated gas within chambers 22A and 22B occurs through openings 23A and 23B. Thus, equilibrium between the ambient atmosphere and the atmosphere in chambers 22A and 22B, with respect to $^{222}$Rn and $^{220}$Tn, is established relatively rapidly. Because $^{222}$Rn and $^{220}$Tn are gaseous, they readily pass through mechanical filters 24 which cover openings 23A and 23B.

While the alpha particle kinetic energies from $^{222}$Rn and its daughter products range from about 5.5 to 7.7 MeV, those of $^{220}$Tn and its daughter products range from about 6.3 to 8.8 MeV.

In the radon decay series, $^{222}$Rn first forms $^{218}$Po, a solid material, and emits an alpha particle having a kinetic energy of 5.5 MeV. Thus, $^{222}$Rn is transformed, on an atomic level, from a gas to a solid which eventually settles upon one of the surfaces provided in one of the chambers 22A or 22B. Further steps in the radioactive decay in the series result in the formation of $^{214}$Po which, in turn, decays to $^{210}$Pb, emitting an alpha particle with the highest kinetic energy in the radon decay series, about 7.7 MeV. In the final steps of the radon decay series, $^{210}$Pb forms the stable lead isotope $^{206}$Pb.

Figure 2:
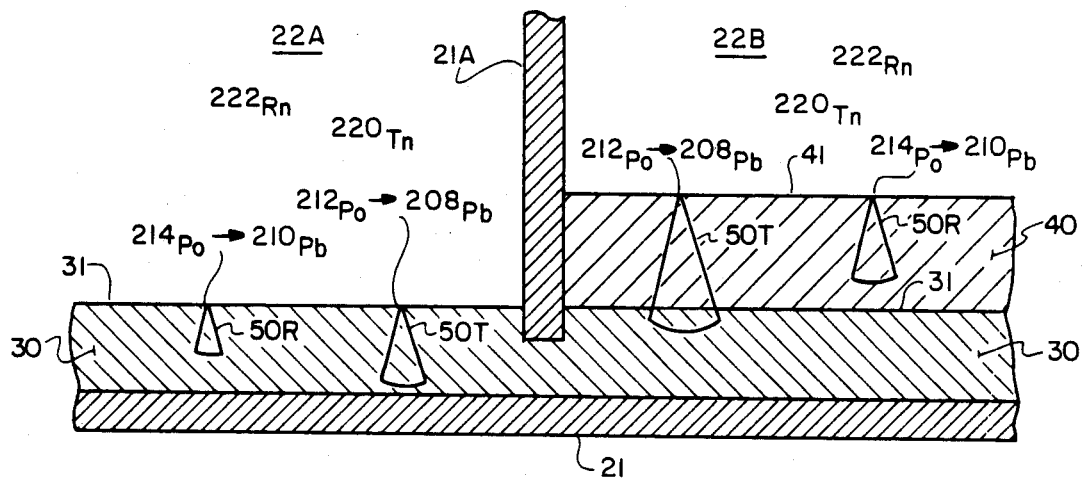
FIG. 2 is an enlarged, fragmentary view of the alpha target member, housing and alpha particle filter of the apparatus schematically illustrated in cross-section in FIG. 1 but illustrating the depth or range of alpha particle penetration through the operative target surface and alpha particle filter, from $^{222}$Rn, $^{220}$Tn and/or their daughter products, in each of the separate chambers shown in FIG. 1.

FIG. 2 shows that because all the isotopes generated between the formation of $^{218}$Po and $^{210}$Pb are solids, over time a certain number of the $^{214}$Po isotopes will settle upon operative surface 31 or filter surface 41 and emit their alpha particles in a direction substantially normal to those surfaces 31 and 41. The conically-shaped radiation damaged tracks, or ranges (i.e., the depth of penetration) through the target member 30 or filter member 40, are indicated at 50R, for the alpha decay having the greatest ranges in the radon decay series.

Likewise, in the thoron decay series, $^{220}$Tn, a gas, first decays to $^{216}$Po (also called Th A), a solid, on an atomic level. Because $^{216}$Po and all subsequent isotopes in the thoron decay series are solids, over time, a certain number of $^{212}$Po isotopes in the series will have settled upon target surface 31 and filter surface 41. $^{212}$Po undergoes alpha decay to form $^{208}$Pb, a stable lead isotope, and emits an alpha particle having a kinetic energy of about 8.8 MeV. Its conically-shaped radiation damaged tracks, or ranges through the target member 30 or filter member 40 are indicated at 50T in FIG. 2. The alpha decay of $^{212}$Po to $^{208}$Pb has the highest kinetic energy in the thoron decay series.

It will be understood by those skilled in the art that the highest energy alpha tracks from the radioactive decay of either $^{222}$Rn or $^{220}$Tn, which are not substantially perpendicular to surfaces 31 and 41 will be substantially shallower than those which are. It will also be understood that the radioactive decay of any daughter products of either of these isotopes which yield kinetic energies less than the maximums which have been illustrated, will be substantially shallower.

It should be noted that while alpha tracks from the radioactive decay of both $^{222}$Rn and $^{220}$Tn have been formed in the target material 30 in chamber 22A, only alpha tracks from the decay of $^{220}$Tn have penetrated the operative surface 31 and been formed in the target material 30 in chamber 22B. The alpha particle filter 40, has thus excluded the penetration of the operative surface 31 by the highest kinetic energy alpha particles emitted from the decay of $^{222}$Rn. Furthermore, the alpha particle filter 40 has caused the terminal portion of the conically shaped radiation damaged zone 50T to penetrate the operative surface 31 in chamber 22B. Thus, the most easily detectable region of the radiation damaged zone, or alpha track, 50T is formed in the alpha target 30 near the operative surface 31.

After exposure of the apparatus 13 to the test atmosphere for the predetermined time, removal of the alpha particle filter 40 and development of alpha target material 30, in an independent manner corresponding to the respective location of the target member 30 in either chamber 22A or 22B, will yield an etch pit count per unit area of operative surface which corresponds to the mean concentration, over time, of the sum of $^{222}$Rn and $^{220}$Tn formed alpha tracks in chamber 22A, and only the $^{220}$Tn formed alpha tracks in chamber 22B.

The direction of development of the target material 30 is preferably from the operative surface 31, to a depth which corresponds at least to the depth of the alpha track left by an alpha particle emitted from $^{214}$Po decay on the target member 30 in chamber 22A. Likewise, the direction of development is preferably from the operative surface 31 on the target member 30 in chamber 22B and to the depth corresponding to the depth of the alpha track left by an alpha particle emitted from $^{212}$Po decay.

Alpha particle filter 40 has a predetermined mass which is sufficient to limit the range of an alpha particle which is emitted in a direction substantially normal to filter surface 41, from the radioactive decay of $^{214}$Po, in order to prevent that alpha particle from reaching operative surface 31 within chamber 22B. However, because the kinetic energy difference between the radioactive decay of $^{214}$Po and the kinetic energy of the alpha particle emission of $^{212}$Po decay is approximately 1.1 MeV, the alpha particle range of the latter decay exceeds the thickness of alpha filter 40 and causes penetration through operative surface 31 and into target member 30 in chamber 22B.

Those skilled in the art will recognize that the only critical feature of the alpha particle filter 40 is its mass per unit area covering operative surface 31. In order to effectively limit the range of alpha particles from $^{222}$Rn decay, yet permit the passage of alpha particles from $^{220}$Tn decay, the necessary mass per unit area should be about 7.4 mg per square centimeter of operative target surface 31. Ideal materials for use as an alpha particle filter 40 has been found to be metal and plastic foils. In particular, the use of aluminum foil about 0.001 inch thick has been verified as a reliable alpha particle filter.

Once the alpha target material has been developed, a count of alpha tracks per unit area, in the filtered and unfiltered portions of the operative surface and target material can be made. The track count per unit area can then be weighted in proportion to the exposure or test time. The time-weighted track count per unit area of operative surface can then be compared to standard counts generated by known concentrations of $^{222}$Rn and $^{220}$Tn, in standard gas mixtures using known exposure times.

Because both chambers 22A and 22B have been exposed to a similar, if not identical atmosphere, the mean concentration, over time, of $^{220}$Tn and $^{222}$Rn can be very accurately determined. It will also be appreciated that because a single piece of alpha particle sensitive material is used to measure both the sum of the $^{222}$Rn and $^{220}$Tn concentrations in chamber 22A, and the $^{220}$Tn concentration alone in chamber 22B, variations due to the alpha reactivity of the independent target members fabricated from different lots or at different times to alpha radiation should be eliminated.

It will be appreciated that the use of the term "alpha particle shield", as explained herein and as used in the claims, consists only of a material of sufficient mass to prevent unintentional contamination of the alpha target member 30 by alpha radiation, in the zone between its operative surface 31 and the maximum range of penetration from that surface into the target member, as produced by the alpha tracks intentionally introduced under test conditions. Thus, the lowermost housing wall 21, adjacent the alpha target member 30 as depicted in FIGS. 1 and 2, could be eliminated if the alpha target member were made sufficiently thick so that the range of alpha particle penetration entering the target member 30 at that location did not extend into the range defined by alpha tracks 50R and 50T.

Likewise, center housing wall 21A is provided merely to prevent stray alpha radiation from "crossing over" between the covered and uncovered portions of the operative surface 31, by entering the uncovered operative surface at an angle so as to give a false indication of the presence of $^{222}$Tn at the covered surface. The error produced by eliminating center wall 21A will, however, be minimal.

Those skilled in the art will recognize that the use of a housing having chambers with predetermined volumes therein, will aid in determining the accuracy of the $^{222}$Rn and $^{220}$Tn concentrations measured by the method and apparatus of the invention.

It will be understood that if it is desired to simply measure the mean concentration of $^{220}$Tn alone, only the contents of chamber 22B are required. An appropriate alpha particle filter placed over the operative surface 31 of an alpha target 30, with the remaining surfaces of the target 30 properly shielded, may be used to accomplish this result.

Finally, it will be appreciated that the method and apparatus of the invention may be utilized to determine the presence of and mean concentrations of $^{220}$Tn and $^{222}$Rn gases in any test gas mixture. Although the test gas mixture is usually the ambient atmosphere at a particular location, the method and apparatus of the invention can clearly be employed to measure the concentrations of the aforementioned gases in other samples such as soils.

The invention consists of certain novel features and a combination of parts, previously described, illustrated in the drawings, and particularly pointed out in the appended claims. While there has been described what is, at present, considered to be a preferred embodiment, it will be understood that various changes in the details may be made without departing from the spirit, or sacrificing any of the advantages of the invention.

What is claimed is:

1. Apparatus for measuring the concentration of thoron in a test gas mixture, which gas mixture may include radon, said apparatus comprising:
   an alpha target member fabricated from an alpha particle sensitive material;
   said alpha target member defining at least one operative target surface;
   an alpha particle filter covering said operative target surface;
   said alpha particle filter having a predetermined mass per unit area of operative target surface;
   said predetermined mass being great enough to prevent the passage of alpha particles emitted from the radioactive decay of radon and any daughter products thereof from passing through said filter; and
   said predetermined mass per unit area being low enough to permit the passage of alpha particles emitted from the radioactive decay of thoron or at least one daughter product thereof through said alpha particle filter.

2. Apparatus in accordance with claim 1 further comprising an alpha particle shield covering the surfaces of said target member except at said operative target surface.

3. Apparatus in accordance with claim 2 wherein said alpha particle shield defines a chamber having an opening formed therein for the communication of said gas mixture with the interior of said chamber;
   said alpha target member is contained in said chamber; and
   said operative target surface and said alpha particle filter covering said target surface are presented toward the interior of said chamber.

4. Apparatus in accordance with claim 1 wherein said predetermined mass per unit area of operative target surface is about 7.4 milligrams per centimeter squared.

5. Apparatus in accordance with claim 1 wherein said alpha particle filter comprises a metal foil.

6. Apparatus in accordance with claim 5 wherein said metal foil comprises aluminum.

7. Apparatus in accordance with claim 6 wherein said aluminum foil is about 0.001 inch thick.

8. Apparatus in accordance with claim 1 wherein said alpha particle filter is plastic foil.

9. Apparatus in accordance with claim 1 wherein alpha particles having kinetic energies of about 7.7 MeV are unable to pass through said alpha particle filter and alpha particles having kinetic energies of about 8.8 MeV are able to pass through said alpha particle filter.

10. Apparatus for measuring the concentration of thoron and radon in a test gas mixture, said apparatus comprising:
    a pair of alpha target members fabricated from an alpha particle sensitive material;
    each of said alpha target members respectively defining at least one operative target surface;
    an alpha particle filter covering the operative target surface of one of said alpha target members of said pair;
    said alpha particle filter having a predetermined mass per unit area of said one operative target surfaces;

said predetermined mass per unit area of said filter being great enough to prevent the passage therethrough of alpha particles emitted from the radioactive decay of radon or any daughter product thereof;

said predetermined mass per unit area of said filter being low enough to permit the passage therethrough of alpha particles emitted from the radioactive decay of thoron or at least one daughter product thereof.

11. Apparatus in accordance with claim 10 wherein said pair of alpha target members are respectively contained in a housing having housing walls and forming a pair of chambers in said housing, one of said target members being located in each of said chambers;

said housing walls being fabricated from an alpha particle shield;

said alpha target members presenting said operative target surfaces to the interior of said chambers;

said housing walls having a pair of openings formed therein, each of said openings respectively providing communication between each of said chambers and the exterior of said housing; and said chambers having a predetermined volume.

12. Apparatus in accordance with claim 11 further comprising a mechanical filter over each of said openings, said filter adapted for permitting the passage of radon and thoron therethrough and adapted for excluding the entry of dust and airborne particulates into said chambers.

13. Apparatus in accordance with claim 10 wherein said pair of alpha target members comprise a single piece of alpha particle sensitive material.

14. A method of measuring the mean concentration of thoron in a test gas mixture, which test gas mixture may include radon, said method comprising the steps of:

forming an alpha target member from an alpha particle sensitive material, said alpha target member including at least one operative target surface thereon;

covering said operative target surface with an alpha particle filter having a predetermined mass per unit area of operative target surface, said predetermined mass per unit area being great enough to prevent the passage therethrough of alpha particles emitted from the radioactive decay of radon or any daughter product thereof, said predetermined mass per unit area being low enough to permit the passage therethrough of alpha particles emitted from the radioactive decay of thoron or at least one daughter product thereof;

shielding all surfaces of said alpha target member, except said filter and at least one operative target surface, with an alpha particle shield;

exposing said shielded and filtered alpha target member to said gas mixture for a predetermined time;

counting the number of alpha tracks formed in said alpha target member, through said at least one operative target surface;

correcting said count of alpha tracks for noise;

weighting said count in proportion to said predetermined time; and comparing said noise-corrected and time-weighted alpha track count to standard alpha track counts generated from known concentrations of thoron gas to determine the mean concentration of thoron gas in said test gas mixture over said predetermined time.

15. A method for simultaneously measuring the concentrations of thoron and radon in a test atmosphere, said method comprising the steps of:

forming an alpha target member from an alpha particle sensitive material, said alpha target member defining at least an operative target surface thereon;

covering a predetermined portion of said operative target surface with an alpha particle filter, said alpha particle filter having a predetermined mass per unit area of said predetermined covered portion of said operative target surface, said predetermined mass per unit area being great enough to prevent the passage therethrough of alpha particles emitted from the radioactive decay of radon or any daughter product thereof, and said predetermined mass per unit area being low enough to permit the passage therethrough of alpha particles emitted from the radioactive decay of thoron or at least one daughter product thereof;

exposing said partially filter-covered alpha target member to the test atmosphere for a predetermined time;

counting the number of alpha particle tracks per unit area of said filter-covered and uncovered portions of said target member;

correcting said alpha counts for noise;

weighting said alpha counts by said predetermined exposure time;

comparing the noise-corrected and time-weighted alpha track count in said filter-covered operative target member to a standard alpha track count generated from a known concentration of thoron to determine the mean concentration of thoron in the test atmosphere over said predetermined time;

subtracting the alpha particle track count in said filter-covered portion of said target member from the alpha particle track count per unit area in the uncovered portion of said target member to thereby obtain a radon track count;

comparing said radon alpha particle track count to a standard alpha particle track count generated from a gas mixture having a known concentration of radon to determine the mean concentration of radon in the test atmosphere over said predetermined time.

* * * * *